Patented May 6, 1952

2,595,853

UNITED STATES PATENT OFFICE 2,595,853

N - (DIALKYLAMINOALKYL) PHENTHIAZINE THEOPHYLLINE ACETATES AND PROCESS FOR PREPARING THE SAME

Raymond Jacques Horclois, Malakoff, France, assignor to Societe des Usines Chimiques Rhone-Poulenc No Drawing. Application December 8, 1950, Serial No. 199,934. In France December 23, 1949

5 Claims. (Cl. 260—243)

The present invention concerns new therapeutically valuable phenthiazine derivatives and a process for producing the same. The present invention has for its object to provide new phenthiazine derivatives having unexpected therapeutic utility. It is a further object of this invention to provide new therapeutic agents for preventing or alleviating travel or motion sickness.

The new compounds of the present invention are the N - (dialkylaminoalkyl) - phenthiazine theophylline acetates corresponding to the following formula:

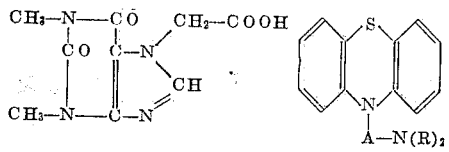

in which the dialkylaminoalkyl chain is $$-A-N(R)_2$$

where A represents a straight or branched divalent aliphatic chain comprising either two or three carbon atoms of which at least two form a chain linking the two nitrogen atoms and R represents a methyl or ethyl group. The group A may thus represent e. g.

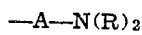

(where X represents a hydrogen atom or a methyl group), or —CH₂—CH₂—CH₂—.

The new salts may be prepared by the neutralisation of theophylline acetic acid with the appropriate N - (dialkylaminoalkyl) - phenthiazine. This neutralisation is carried out directly or, preferably, in organic solvents such as ethyl or methyl alcohol or chloroform, in which the salts in question are soluble at elevated temperature. Preferably, the reactants together with solvent are heated under reflux until the reaction is completed.

The new salts of the invention, especially those in which the dialkylamino alkyl chain is

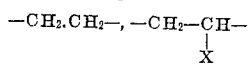

where X represents a hydrogen atom or a methyl group, have been found to be particularly useful in the treatment of travel or motion sickness (sea sickness, air sickness etc.) and thus have valuable application in human and veterinary medicine.

The following examples illustrate the preparation of preferred salts of the invention; the melting points indicated are instantaneous melting points determined on the Maquenne Block.

Example I

N - (2' - dimethylaminoethyl) - phenthiazine (150 g.) is heated under reflux for half an hour with theophylline acetic acid (120 g.) in absolute alcohol (500 c. c.). The mixture is treated with charcoal and filtered hot. The alcohol is distilled off and the resin obtained is re-dissolved in ethyl acetate (200 c. c.). After cooling and seeding, crystallisation takes place. The mixture is diluted with ether (500 c. c.) filtered and washed twice with ether (2 x 100 c. c.). The product is dried in vacuo at 25° C. N-(2'-dimethylaminoethyl)-phenthiazine theophylline acetate (200 g.) is obtained, melting at 132° C.

Analysis of the product shows that it contains effectively one molecule of theophylline acetic acid to one molecule of base.

Example II

N - (2' - diethylaminoethyl) - phenthiazine (330 g.) is heated under reflux for half-an-hour with thiophylline acetic acids (238 g.) in absolute alcohol (1500 c. c.). The mixture is treated with charcoal and filtered hot. Alcohol (1100 c. c.) is distilled off and the residue is diluted with ether (1 litre). On seeding, copious crystallisation takes place. The product is filtered off, washed with ether (2 x 200 c. c.) and then dried in vacuo at 25° C. N-(2'-diethylaminoethyl)-phenthiazine theophylline acetate (500 g.) is obtained, melting at 110° C.

Analysis of this product shows that it contains effectively one molecule of theophylline acetic acid in one molecule of base.

Example III

N - (2' - diethylaminoethyl) - phenthiazine (165 g.) is fused with theophylline acetic acid (119 g.) with agitation by heating in a flask immersed in an oil-bath which is raised to 130° C.

The molten mass is poured into a mortar, cooled and finely powdered. Acetone (400 c. c.) is added and the mixture ground in the mortar. The resinous product is thereby converted into a white crystalline powder. The product is filtered, washed with acetone (2 x 100 c. c.), and dried in vacuo. N-(2'-diethylaminoethyl)-phenthiazine theophylline acetate (260 g.) is obtained, melting at 110° C. as in Example II.

Example IV

N - (2' - dimethylamino - 2' - methyl - ethyl) - phenthiazine (375 g.) is heated under reflux for half-an-hour with theophylline acetic acid (286 g.) in methyl alcohol (500 c. c.). The mixture is treated with charcoal and filtered hot; methyl alcohol (300 c. c.) is distilled off. After cooling and seeding, a copious crystallisation takes place. The product is filtered off, washed with a mixture of methyl alcohol (30 c. c.) and ether (100 c. c.), and then with ether (2 x 100 c. c.). The product is dried in vacuo at 50° C. and N-(2'-dimethylamino - 2' - methyl - ethyl) - phenthiazine theophylline acetate (550 g.) is obtained, melting at 134–135° C.

Analysis of this product shows that it contains effectively one molecule of theophylline acetic acid to one molecule of base.

Example V

N - (2' - diethylamino - 2' - methyl - ethyl) - phenthiazine (410 g.) is heated under reflux for 2 hours with theophylline acetic acid (310 g.) in absolute alcohol (4 litres). The mixture is treated with charcoal and filtered hot. After cooling and seeding, a copious crystallisation takes place. The product is filtered at +5° C. and dried in vacuo at 50° C. N-(2'-diethylamino - 2' - methyl - ethyl) - phenthiazine theophylline acetate (680 g.) is obtained, melting at 131–132° C.

Analysis of this product shows that it contains effectively one molecule of theophylline acetic acid to one molecule of base.

I claim:

1. The N - (dialkylaminoalkyl) - phenthiazine theophylline acetate possessing efficacy in the treatment of motion sickness and in which the dialkylaminoalkyl group is A—N(R)$_2$ where A is selected from the class consisting of straight and branched alkylene chains containing not less than two and not more than three carbon atoms of which at least two form a chain linking the two nitrogen atoms and R is selected from the group consisting of methyl and ethyl.

2. N - (2' - dimethylaminoethyl) - phenthiazine theophylline acetate.

3. N - (2' - dimethylamino - 2' - methylethyl)-phenthiazine theophylline acetate.

4. N - (2' - diethylamino - 2' - methylethyl)-phenthiazine theophylline acetate.

5. Process for the preparation of new, therapeutically valuable phenthiazine derivatives which comprises neutralising theophylline acetic acid with an N-(dialkylaminoalkyl)-phenthiazine in which the dialkylaminoalkyl chain is as defined in claim 1, the neutralisation being effected by heating the reactants under reflux in an organic solvent in which the resultant salt is soluble at elevated temperature.

HORCLOIS, RAYMOND JACQUES.

REFERENCES CITED

The following references are of record in the file of this patent:

UNITED STATES PATENTS

| Number | Name | Date |
|---|---|---|
| 1,920,697 | Hornstein | Aug. 1, 1933 |
| 2,483,999 | Hunter et al. | Oct. 4, 1949 |
| 2,534,237 | Cusic | Dec. 19, 1950 |

FOREIGN PATENTS

| Number | Country | Date |
|---|---|---|
| 352,980 | Germany | May 11, 1922 |